United States Patent Office 3,372,040
Patented Mar. 5, 1968

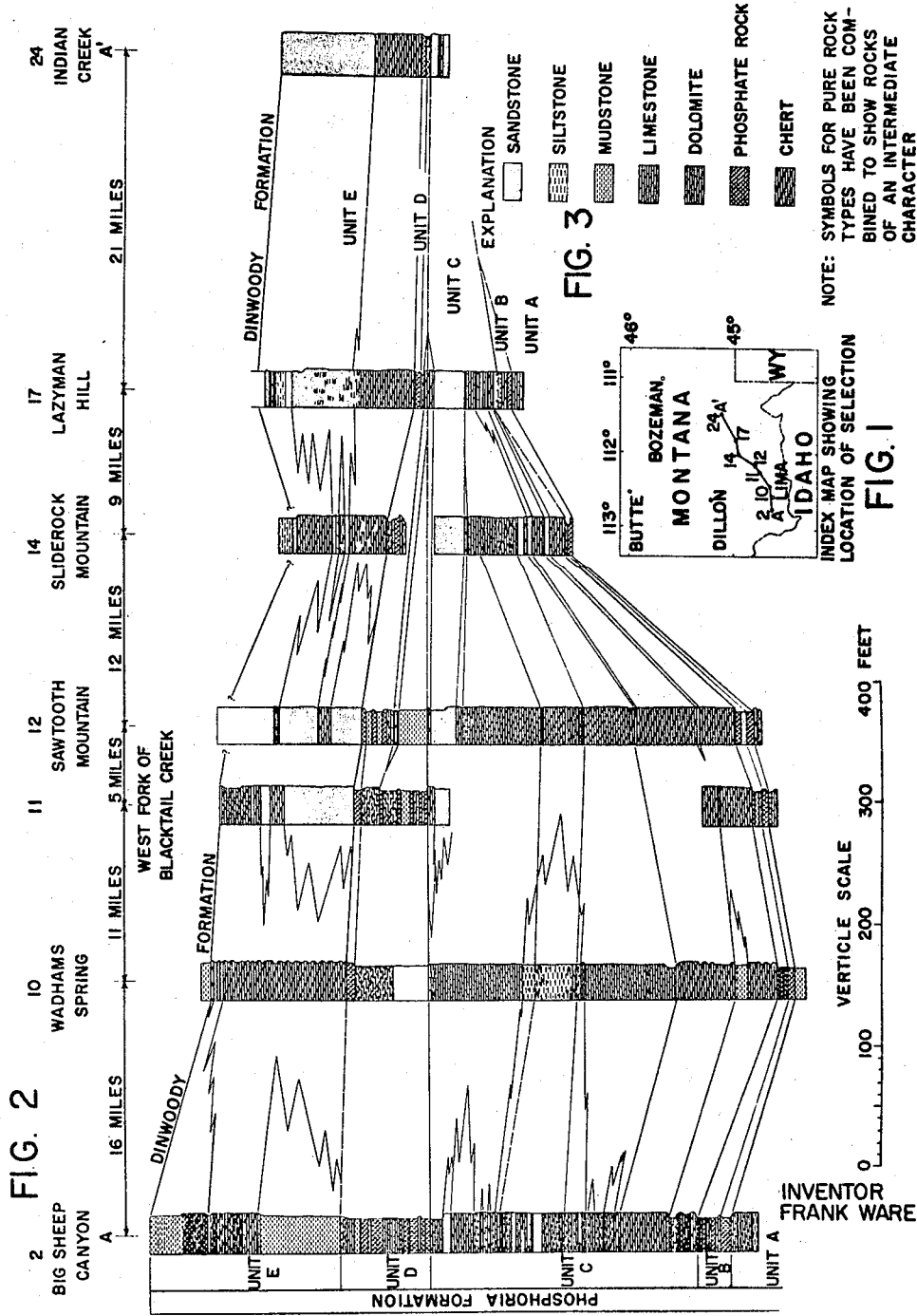

3,372,040
FIRE-RESISTANT CEMENTITIOUS
PLASTER COMPOSITION
Frank Ware, 12092 Chillicothe Road,
Chesterland, Ohio 44026
Filed Nov. 20, 1962, Ser. No. 238,861
1 Claim. (Cl. 106—15)

This invention relates to the preparation of fire-resistant cementitious compositions and more specifically to fire-resistant cementitious plaster compositions. Still more specifically, the invention is directed to a method of preparing fire-resistant cementitious plaster compositions by adding thereto effective amounts of a naturally-occurring phosphate rock and shale.

Cementitious mixtures, particularly plasters such as gypsum, may contain exfoliated vermiculite and/or perlite as the insulation material but can be improved further by adding effective amounts of a naturally-occurring phosphate rock and shale as a fire-retardant. This naturally-occurring phosphate rock, which contains a large percent of phosphorus oxide in addition to the associated elements, is very effective as a retardant in construction materials, such as wallboard, lath, acoustical and insulation plasters, or the like. Plasters normally are cementitious materials, such as cement, lime, and/or gypsum, i.e. calcuim sulfate hemi-hydrate mixed in prescribed proportions. In addition, other ingredients are added to these materials to effect proper setting, plasticity, workability, strength, etc. Retarders are added to plaster to inhibit the absorption of water which delays the setting action. Lime, for example, is added to portland cement as a plasticizer to improve the workability of the plaster and is added to gypsum to improve the strength. Organic binders, surface active agents, and/or exfoliated materials are added to cementitious or plaster compositions in requisite proportions to obtain a product designed for a particular use.

As distinguished from the heavy masonry materials, large amounts of exfoliated perlite and/or vermiculite are being incorporated in gypsum plaster or other cementitious mixtures in order to provide walls, partitions, ceilings, etc., with coatings which insulate these structures and thus provide fire protection. These fireproofed plasters may be sprayed directly to columns, beams, corrugated, flat, or cellular floors, with conventional plastering machines. It is important to insulate these members from extreme temperatures which cause them to weaken or fail under building loads. The critical temperature for structural steel is approximately 1,000° F. and for walls, floors, and ceilings approximately 250° F. above room temperature. Structural members coated with insulating plasters have been able to withstand these temperatures for periods up to four hours by applying the plaster in thicknesses up to about two inches.

While these insulating plasters are satisfactory for insulating structures from these temperatures for a period of time, they do not, however, retard the flame and are inadequate at extremely high temperatures. Both the gypsum and portland cement containing plasters when subjected to high temperatures have a tendency to lose water, which helps to retard the transmission of heat until all of the water is released, but then begins to harden and crack exposing the structural members to the open flames.

It has been discovered that by using a naturally-occurring phosphate rock or shale containing phosphorus oxide and associated elements in combination with the plaster or cementitious composition, the plaster's effectiveness to insulate the structural members is substantially improved in that the phosphate rock actually retards and extinguishes the flame. The low cost and ready availability of the naturally-occurring phosphate rock and shale provide an excellent means of fireproofing these cementitious compositions, particularly for exceptionally high temperatures.

Accordingly, it is an object of this invention to provide a new and improved cementitious or plaster composition containing an effective amount of a naturally-occurring phosphate rock and shale.

It is another object of this invention to provide a fire-resistant cementitious or plaster composition comprising a major amount of portland cement, calcium sulfate hemi-hydrate, or mixtures thereof, and 1 to 50 percent by weight of a naturally-occurring phosphate rock containing about 0.25 to 40 percent by weight of phosphorus oxide.

It is still another object of this invention to provide a fire-resistant cementitious composition containing an effective amount of an exfoliated insulating material and a naturally-occurring phosphate rock which contains 0.25 to 40 percent by weight of phosphorus pentoxide.

It is still another object of this invention to provide a gypsum or calcium sulfate hemi-hydrate plaster containing in addition to adhesives, binders, dispersants, air-entraining agents, and other known plaster ingredients, a small but effective amount of a naturally-occurring phosphate rock containing a large percent of phosphorus pent-oxide.

It is a still further object of this invention to provide a method of preparing a fire-resistant cementitious composition, such as plaster, by adding thereto an effective amount of a naturally-occurring phosphate rock and shale containing 10 to 30 percent by weight of phosphorus oxide.

It is a still further object of this invention to provide a method of imparting fire-resistance and insulating properties to a cementitious or plaster composition by adding thereto effective amounts of a naturally-occurring phosphate rock and shale which comprises up to about 40 percent by weight of $P_2O_5$, together with its associated elements.

It is a still further object of this invention to provide a means of preparing cementitious or plaster containing articles, such a wallboard, lath, and other similar building materials made with this cementitious mixture, by adding thereto an effective amount of a naturally-occurring phosphate rock and shale. The rock is characterized particularly by containing 0.25 to 40 percent by weight of phosphorus oxide and associated elements.

These and other objects of the invention will become apparent by a further and more detailed description of the invention to follow.

It has been discovered that cementitious or plaster compositions of the type used in the construction field, building of churches, schools, hospitals, and the like, could be made fire resistant by adding to the composition effective amounts of a naturally-occurring phosphate rock; the phosphate rock containing in addition to 0.25 to 40 percent by weight of $P_2O_5$ other associated elements which coact to function as a fire retardant, and thus prevent the transmission of heat. The presence of this $P_2O_5$-containing rock in these building materials prevents the transmission of heat at temperatures as high as 2,000° C. and thus is effective in protecting the structure for periods acceptable by most building codes.

The naturally-occurring phosphate rock and shale is obtained from phosphoria formations and deposits and has 0.25 to 40 percent by weight of $P_2O_5$. This rock and shale can be crushed to 10 to 350 mesh and added to the cementitious or plaster composition in the range of 1 to 50 percent by weight of the total mixture. Portland cement, calcined gypsum or calcium sulfate hemi-hydrate, and mixtures thereof may be combined with up to 50 percent of this naturally-occurring phosphate rock. In addition to the rock and cementitious material, other ingredients may be added depending on the ultimate use of the product. These may include, for example, 0 to 20 percent by weight of finished lime; 0 to 50 percent by weight of exfoliated insulating material, i.e. expanded perlite, vermiculite, and mixtures thereof; 0 to 2 percent by weight of an adhesive binder; and 0 to 1.0 percent by weight of a surface active agent or detergent. Either the portland cement, calcium sulfate, or mixtures of both of these materials in any proportions, may contain 1 to 50 percent by weight of the phosphate rock and shale, and small amounts of one or more of the other ingredients. The ingredients and the proportions thereof will depend on the use of the final product; thus, for example, for an exterior plaster up to 10 percent of lime may be used with gypsum plaster.

Other compositions comprise large amounts of cement with up to 10 percent by weight of calcined gypsum, or calcium sulfate hemi-hydrate. Portland cement is essentially a calcium-aluminum-magnesium silicate which is prepared by combining mixtures comprising calcium carbonate and aluminum silicate and consists of approximately the following ingredients:

| | Percent by weight |
|---|---|
| $CaO$ | 60–67 |
| $SiO_2$ | 17–25 |
| $Al_2O_3$ | 3–8 |
| $Fe_2O_3$ | 0.5–6.0 |
| $MgO$ | 0.1–5.5 |
| $Na_2O+K_2O$ | 0.5–1.3 |
| $SO_3$ | 1–3 |

The lime, used particularly for finish coat plasters, is a hydrated lime and is obtained from calcium limestone or other naturally-occurring rocks, such as dolomite. The stone is burned in a kiln at very high temperatures to drive off moisture and separate the carbon dioxide and calcium oxide. This form of calcium oxide is known as quicklime which is partially hydrated before being used in plaster. Gypsum is a calcium sulfate dihydrate which is calcined to drive off a majority of the water of crystallization, leaving a calcium sulfate hemi-hydrate containing about one-half mole of water. However, when the calcined calcium sulfate is used in plaster, it recombines with the water forming the hydrate, which causes it to harden.

In addition to the cementitious components, aggregates, and particularly the exfoliated lightweight aggregates, such as vermiculite and perlite, may be used in ranges up to 50 percent or more of the total plaster.

The exfoliated aggregates will vary in particle size and proportion depending on the type and ultimate use of the composition being prepared. Large proportions of the expanded aggregates are used in the plaster or cementitious mixture for their insulating and fire-resistant properties. These materials are silicious or micaceous particles which are obtained by heat treating the ore at temperatures in excess of 1600° F., which causes them to expand to several times their original volume into a lightweight cellular product. Perlite, for example, is chemically inert and has a bulk density ranging from about 4 to 15 pounds per cubic foot. It is nonhygroscopic and contains less than one-half percent by weight of moisture. It is because of the low density and chemical inertness of the exfoliated materials that they are considered valuable as an insulating additive. The expanded particles of vermiculite and perlite have a plurality of air cells which retard or insulate the transmission of heat. The particle sizes of the exfoliated material may range up to 80 mesh or more, with the preferred size being below 50, i.e. 16 to 20 mesh.

The adhesive or binder for the cementitious mixture may include organic compounds, such as gum acacia, gum karaya, gum tragacanth, dextrin, starch, glue, sodium carboxymethyl cellulose, hydroxyethyl cellulose, hydroxymethyl cellulose, gum arabic, and mixtures of these binders with water-dispersible or soluble resins. Mixtures of polyvinyl acetate or polyvinyl chloride aqueous dispersions with other types of adhesive gums or binders may be added to the cementitious composition to obtain a product which can be applied by spraying, troweling, or any other means, directly to steel or concrete structures with excellent adhesion. Plaster coatings are obtained by building up layers of ¼ to ½ inch until thicknesses of 1 to 2 inches are obtained. Aqueous emulsions of polyvinyl chloride or acetate, containing up to 70 percent of water, are particularly good binders for those plasters which are to be applied directly to steel beams, metal lath, or the like. They may be used alone or in combination with other adhesives, such as carboxymethyl cellulose, gum arabic, gum karaya, etc.

To lower the density and to improve the wetting properties of the wet cementitious plaster, small amounts of surfactants in the range of 0.0 to 1.0 percent by weight may be used in the composition. These surfactants act as foaming agents which entrain air in the mixture as it is pumped and sprayed onto the wall surface. They have a tendency to make the finished plaster very porous and as such contribute to the effectiveness of the composition as an acoustical plaster. The surfactants are known to reduce the surface or interfacial tension between the air and aqueous phase of the ingredients and thus reduce the surface tension of the wet plaster, increasing its wetting properties.

In general, the sulfonates are known for their effectiveness in reducing the surface tension and are considered non-polar in character but contain one group or molecular segment of high polarity, or at least a relatively high polarity. Thus, when these compounds are added to water, the polar or hydrophylic segment of the molecule tends to dissolve while the non-polar or hydrophobic segment tends to resist going into solution. Consequently, when the surface active agent is in the air-water interphase, the hydrophobic segment projects into the lower polarity air phase and the hydrophylic projects into the polar water phase. Thus, because of this surface activity between the polar and nonpolar phases, the surfactant orients at the interphase with the hydrophobes projecting into the gas or air phase and the hydrophils extending into the liquid, which causes foaming and improves the wetting propertise of the mixture. Of the many surfactants, the anionics, such as the alkyl, aryl, alkyl aryl, or aralkyl sulfonates containing from 5 to 22 carbon atoms per molecule, are preferred. These sulfonates include, for example, the alkaline earth and alkali metal salts of benzyl sulfonic acid, dodecyl benzene sulfonic acid, alkyl toluene sulfonic acid, petroleum sulfonic acid, amyl pheny sulfonic acid, butyl diphenyl sulfonic acid, etc. Other anionics include alkali metal tetradecyl sulfate, alkyl phenyl polyethylene glycol, sodium lauryl sulfate, heptadecyl sulfate, octyl phenyl polyethoxy ethanol, etc.

The cationic surfactants include compounds having hydrophobic groups which form cations in solution. These materials include the amines, such as quaternary ammonium compounds. Other surfactants are the nonionics which include the reaction products of either an aromatic or aliphatic alcohol with several moles of an epoxide, such as ethylene or propylene oxide. These polyoxyalkylene glycol ethers include such compounds as polyethylene glycol ether of alkyl phenol or polypropylene glycol ether of octyl phenol. Others are the aliphatic substituted di-tertiary butyne and octyne diols or glycols, wherein the aliphatic substituents have from about 1 to 18 carbon atoms per molecule. One or more of these surfactants, particularly mixtures of the nonionic and cationic surfactants, such as the butyne or octyne diols with the alkali metal sulfonates, e.g. lignosulfonate, can be used.

It has been discovered that the cementitious or plaster compositions containing cement, calcium sulfate hemi-hydrate, or mixtures thereof, with or without the other additives described above, when combined with effective amounts of naturally-occurring phosphate rock and shale will give a product which is fireproof. The naturally-occurring phosphate rock and shale is found in phosphoria formations and deposits in the West, or in phosphate beds or deposits in southern states, such as Florida, Tennessee, but more particularly in western states, such as Montana and Idaho. This naturally-occurring phosphate rock and shale can be pulverized to a particle size ranging from 10 to 350 mesh, preferably 50 to 100 mesh, and combined with the plaster composition in an amount ranging from 1 to 50 percent by weight.

The particle size and amount of phosphate rock used with the cementitious mixture will depend upon the $P_2O_5$ content and the ultimate use of the product. Thus, for example, where the $P_2O_5$ content is approximately 30 percent by weight of the rock, small amounts, e.g. less than 10 percent by weight of the rock can be used with the cementitious composition, whereas if smaller amounts of $P_2O_5$ are present in the rock, then larger amounts, e.g. 40 percent by weight, can be used with the cementitious composition.

A more specific description of the naturally-occurring rock and shale is identified by the chart which has an index map that gives the location of a specific phosphoria formation. The chart is an illustration of a stratigraphic section showing the location of the entire phosphoria formation from Big Sheep Canyon to Indian Creek, for a total of about 74 miles. The phosphoria is divided into units E, D, C, B, and A. These formations have rock and shale sections containing from about 0.25 to 40 percent by weight of $P_2O_5$. A particular cut A in unit D at Sawtooth Mountain, point 12 on the index map, shows the exact location as it presently exists in the southern part of the State of Montana. The vertical depth of unit D is approximately 60 feet and comprises the phosphate rock, mudstone, and minor amounts of dolomite and chert. The exact composition of cut A of unit D was found to have the following analyses:

TABLE I.—CUT A

| Assay No. | Percent | | | Width | Description |
|---|---|---|---|---|---|
| | U | Th | $P_2O_5$ | | |
| 12 | 0.001 | 0.2 | 0.25 | Slump | Chert. |
| 11 | 0.001 | 0.1 | 0.50 | 3' | Argillaceous siltstone. |
| 14 | 0.001 | 0.2 | 30.91 | 3" | Phosphate rock. |
| 10 | 0.001 | 0.2 | 18.79 | 12'6" | Phosphate shale. |
| 13 | 0.003 | 0.2 | 27.05 | 2'5" | Phosphate rock. |
| 9 | 0.002 | 0.2 | 11.16 | 18'4" | Black shale seams with a 6" seam of pure phosphate rock, the shale section being highly petroliferous. |
| 8 | 0.001 | 0.1 | 1.47 | 2'4" | Siltstone. |
| 7 | 0.001 | 0.2 | 8.68 | 8'1" | Petroliferous shale. |
| 6 | 0.003 | 0.1 | 2.06 | 2'2" | Petroliferous siltstone. |
| 5 | 0.003 | 0.2 | 9.73 | 4'9" | Phosphatic shale petroliferous with 3" seam of phosphate rock. |
| 4 | 0.001 | 0.2 | 3.16 | 2'3" | Siltstone. |
| 3 | 0.002 | 0.2 | 10.73 | 8'6" | Black dolitic phosphate rock which is petroliferous. |
| 2 | 0.005 | 0.1 | 30.59 | 1'3" | Phosphate rock, slightly petroliferous. |
| 1 | 0.002 | 0.2 | 28.14 | 1'5" | Petroliferous phosphate rock. |

In addition to the U, Th, and $P_2O_5$ content of the above-described Cut A, as shown in the graph of the Phosphoria formation of unit D at Sawtooth Mountain (12), the following chemical analyses also were obtained.

TABLE II.—ANALYSES OF ORE

| Sample | Assay No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Major, greater than 10% | $P_2O_5$ | CaO | $SiO_2$ | | $SiO_2$ | $SiO_2$ | | CaO | | | CaO | $SiO_2$ | CaO | CaO |
| Major/minor, 5–25% | $SiO_2$ CaO | | $Al_2O_3$ $Fe_2O_3$ | $SiO_2$ CaO $P_2O_5$ | $Al_2O_3$ CaO $P_2O_5$ | $Al_2O_3$ CaO | $SiO_2$ CaO | | $SiO_2$ CaO $P_2O_5$ | $SiO_2$ CaO | | | $P_2O_5$ $SiO_2$ | $P_2O_5$ $SiO_2$ |
| Minor, 1–10% | | $SiO_2$ | | MgO $P_2O_5$ | | MgO | $Al_2O_3$ $P_2O_5$ | $SiO_2$ MgO | | $Al_2O_3$ $K_2O$ $P_2O_5$ | $SiO_2$ | | | |
| Minor/Low, .5–5% | $Al_2O_3$ $Fe_2O_3$ | $Al_2O_3$ $Fe_2O_3$ | $Fe_2O_3$ | $Al_2O_3$ $Fe_2O_3$ $K_2O$ | $Fe_2O_3$ $K_2O$ | $Fe_2O_3$ $P_2O_5$ | $Fe_2O_3$ $K_2O$ | $P_2O_5$ | $Al_2O_3$ $Fe_2O_3$ $K_2O$ | $Fe_2O_3$ | MgO | CaO | $Al_2O_3$ $Fe_2O_3$ | $Al_2O_3$ $Fe_2O_3$ |
| Low, .1–1% | MgO $Na_2O$ $K_2O$ | MgO $Na_2O$ | $TiO_2$ MgO ZnO $Na_2O$ $K_2O$ | $Na_2O$ | $TiO_2$ MgO $Na_2O$ | $Na_2O$ $K_2O$ | MgO ZnO $Na_2O$ | $Al_2O_3$ $Fe_2O_3$ | MgO ZnO $Na_2O$ | $TiO_2$ MgO ZnO $Na_2O$ | $Al_2O_3$ $Fe_2O_3$ $P_2O_5$ | $P_2O_5$ | MgO ZnO $B_2O_3$ | MgO ZnO $B_2O_3$ |
| Low/Very Low, .05–.5% | $TiO_2$ $Cr_2O_3$ $V_2O_5$ ZnO | $Cr_2O_3$ $V_2O_5$ ZnO $K_2O$ | $Cr_2O_3$ | $TiO_2$ MnO | $Cr_2O_3$ ZnO | $TiO_2$ $Cr_2O_3$ MnO | $TiO_2$ $Cr_2O_3$ $V_2O_5$ | | $TiO_2$ $Cr_2O_3$ $V_2O_5$ | $Cr_2O_3$ $V_2O_5$ | | $Fe_2O_3$ | $Cr_2O_3$ $V_2O_5$ $K_2O$ | $Cr_2O_3$ $K_2O$ |
| Very Low, .01–.1% | MnO $Li_2O$ | $TiO_2$ MnO | $V_2O_5$ MnO | $Cr_2O_3$ $V_2O_5$ ZnO $Li_2O$ | $V_2O_5$ MnO $Li_2O$ | $V_2O_5$ $Li_2O$ | $Li_2O$ | $TiO_2$ $Cr_2O_3$ $V_2O_5$ $Na_2O$ $K_2O$ | $Li_2O$ | $ZrO_2$ $Li_2O$ | $Cr_2O_3$ $V_2O_5$ $B_2O_3$ | $Al_2O_3$ $B_2O_3$ | $TiO_2$ MnO | $TiO_2$ $V_2O_5$ MnO |
| Very Low/Trace, .005–0.5% | $ZrO_2$ SrO | $ZrO_2$ SrO $Li_2O$ | NiO $ZrO_2$ SrO $Li_2O$ | SrO | NiO $ZrO_2$ $B_2O_3$ SrO | $ZrO_2$ $B_2O_3$ SrO | NiO MnO $ZrO_2$ $B_2O_3$ SrO | SrO | NiO $ZrO_2$ $MoO_3$ $B_2O_3$ SrO | CuO NiO MnO $MoO_3$ $B_2O_3$ SrO | $TiO_2$ MnO SrO | MgO $B_2O_3$ | NiO $ZrO_2$ SrO $_2$O | NiO $ZrO_2$ SrO $Li_2O$ |
| Trace, less than .01% | CuO NiO $Bi_2O_3$ $MoO_3$ $SnO_2$ $Ag_2O$ $B_2O_3$ BaO $Cb_2O_3$ | CuO NiO $Bi_2O_3$ $MoO_3$ $SnO_2$ $Ag_2O$ $B_2O_3$ BaO $Cb_2O_3$ | CuO $Bi_2O_3$ $MoO_3$ $SnO_2$ $Ag_2O$ $B_2O_3$ BaO $Cb_2O_3$ | CuO NiO $Bi_2O_3$ $ZrO_2$ $MoO_3$ $SnO_2$ $Ag_2O$ $B_2O_3$ BaO | CuO $Bi_2O_3$ $MoO_3$ $SnO_2$ $Ag_2O$ BaO $Cb_2O_3$ | CuO NiO $Bi_2O_3$ $MoO_3$ $SnO_2$ $Ag_2O$ ZnO BaO | CuO NiO $Bi_2O_3$ $MoO_3$ $SnO_2$ $Ag_2O$ BaO $Cb_2O_3$ | CuO NiO MnO $Bi_2O_3$ $ZrO_2$ $MoO_3$ $SnO_2$ $Ag_2O$ BaO $Cb_2O_3$ | CuO $Bi_2O_3$ $MoO_3$ $SnO_2$ $Ag_2O$ BaO $Cb_2O_3$ | $Bi_2O_3$ $SnO_2$ $Ag_2O$ BaO $Cb_2O_3$ CdO | CuO $Bi_2O_3$ $ZrO_2$ $MoO_3$ $SnO_2$ $Ag_2O$ $B_2O_3$ ZnO BaO $K_2O$ $Li_2O$ | $TiO_2$ CuO NiO $Cr_2O_3$ $V_2O_5$ MnO $Bi_2O_3$ $ZrO_2$ $MoO_3$ $SnO_2$ $Ag_2O$ ZnO BaO SrO $K_2O$ | CuO $Bi_2O_3$ $MoO_3$ $SnO_2$ $Ag_2O$ $B_2O_3$ BaO $Cb_2O_3$ CdO | CuO $Bi_2O_3$ $MoO_3$ $SnO_2$ $Ag_2O$ $B_2O_3$ BaO CdO |

The phosphoria in the southwestern part of Montana is shown to be divided into five groups in an ascending order of sandstone dolomite, a thin phosphatic shale, a sandstone dolomite chert, an upper phosphatic shale, and a chert quartz sandstone. The upper phosphatic shale member, or unit D as indicated in the chart and more specifically in the table, is particularly rich in phosphate rock and shale which contain higher percentages of $P_2O_5$. Unit D contains phosphate rock comprising 10 to 20 percent of a carbonate fluoro-apatite. The mudstone of this unit may contain as much as 20 to 25 percent organic matter, about 10 percent of which is a distillable oil. Commercially this phosphate rock is available as one or more phosphate minerals, primarily calcium phosphate, but may include phosphitized limestone, sandstone, shale, and other forms of phosphate rock. While these phosphate materials do not have a definite chemical structure, the major minerals are of the apatite group and are represented by the formula $Ca_{10}(PO_4CO_3)_6(FClOH)_2$ where, in some instances, the phosphate radical is replaced with small quantities of metal oxides and the anions, i.e. fluorine, may be a combination of fluorine, chlorine, and hydroxyl ions, or any one alone. In addition, small quantities of calcium may be replaced by elements, such as magnesium, manganese, strontium, lead, sodium, uranium, cerium, and yttrium. Other impurities include iron as limonite, clay, aluminum phosphate, fluorine, and silica as quartz.

Particularly in the Western States, the Phosphoria formations range from 60 to 180 feet in thickness and contain yellowish or brown phosphatic shale, limestone, and oolitic phosphate rock.

Typical cementitious and plaster compositions of this invention are illustrated in the following examples. The plaster composition may be mixed with water to obtain a wet composition having 40–60% by weight of water.

*Example I*

| | Percent by weight |
|---|---|
| Portland cement | 0–90 |
| Calcium sulfate | 0–90 |
| Lime | 0–20 |
| Exfoliated insulating aggregates | 0–50 |
| Adhesive binder | 0–2 |
| Surfactant | 0–1 |
| Phosphate rock and shale | 5–50 |

*Example II*

| | |
|---|---|
| Portland cement | 50–90 |
| Lime | 0–20 |
| Exfoliated aggregate (perlite and vermiculite) | 0–50 |
| Adhesive binder | 0–2 |
| Surface active agent | 0–1 |
| Phosphate rock and shale | 5–50 |

*Example III*

| | |
|---|---|
| Calcium sulfate hemi-hydrate | 50–90 |
| Lime | 0–20 |
| Exfoliated aggregate (perlite and vermiculite) | 0–50 |
| Adhesive binder | 0–2 |
| Surface active agent | 0–1 |
| Phosphate rock and shale | 5–50 |

*Example IV*

| | |
|---|---|
| Calcium sulfate hemi-hydrate | 50–90 |
| Lime | 0–10 |
| Phosphate rock and shale | 10–50 |

*Example V*

| | |
|---|---|
| Portland cement | 35–80 |
| Finished lime | 2–12 |
| Phosphate rock | 10–50 |

*Example VI*

| | |
|---|---|
| Portland cement | 42 |
| Finished lime | 7 |
| Gum karaya | 0.5 |
| Alkyl aryl sodium sulfonate | 0.5 |
| Exfoliated perlite (20 mesh) | 30 |
| Phosphate shale (80 mesh) (9.73% $P_2O_5$) | 20 |

*Example VII*

| | |
|---|---|
| Calcium sulfate hemi-hydrate | 85 |
| Lime | 5 |
| Phosphated shale (9.73% $P_2O_5$) | 5 |
| Exfoliated perlite (16 mesh) | 5 |

*Example VIII*

| | |
|---|---|
| Portland cement | 75 |
| Lime | 5 |
| Exfoliated vermiculite | 10 |
| Phosphate shale | 10 |

*Example IX*

| | |
|---|---|
| Calcium sulfate hemi-hydrate | 5 |
| Portland cement | 55 |
| Exfoliated perlite and vermiculite (20 mesh) | 5 |
| Phosphate shale | 35 |

*Example X*

| | |
|---|---|
| Calcium sulfate hemi-hydrate | 82 |
| Lignosulfonate | 1 |
| Exfoliated perlite | 5 |
| Polyvinyl acetate | 2 |
| Phosphate rock (30.9% $P_2O_5$) | 10 |

*Example XI*

| | |
|---|---|
| Portland cement | 60 |
| Sodium lauryl sulfate | 0.5 |
| Calcium sulfate | 8 |
| Gum arabic | 1.5 |
| Lime | 5 |
| Exfoliated perlite | 5 |
| Phosphate shale (80 mesh) (9.73% $P_2O_5$) | 20 |

The phosphate rock and shale as described is a naturally-occuring form which contains approximately 0.25 to 40 percent by weight of $P_2O_5$ as the essential constituent together with associated elements. The use of this rock as a fire retardant is particularly important commercially in that it has a definite advantage over the use of other chemical retardants. It is substantially cheaper and is available in larger quantities. The effectiveness and the availability together with the low cost of the rock provides a means of fireproofing these cementious plaster compositions to a point beyond that which might ordinarily be expected.

In addition to utilizing the ore as it exists in its naturally-occurring state, it is possible to remove some of the heavy material which contains smaller amounts of phosphorus oxide, such as the clay, siltstone, dolomite, and silica, or any of the materials which add to the weight of the rock but contribute little phosphorus oxide and associated elements. Thus, for example, modified forms of the naturally-occurring rock can be prepared by removing clay, limestone, etc., without appreciably losing the associated metals which are responsible for the fireproofing qualities, thus making it commercially possible to use smaller amounts of a rich $P_2O_5$ rock with the cementitious product.

To illustrate the effectiveness of this rock and shale as a fire retardant in the cementitious or plaster compositions described, a specific petroliferous shale having a $P_2O_5$ content of approximately 9.7 percent, together with the associated elements, is shown as Assay No. 5 of Table I. This sample was taken from Cut A in Section D, located in Section 15, Township 12, South Range 5, West Principal Meridian, Montana.

The phosphate shale, containing approximately 9.7 percent by weight of $P_2O_5$ was mixed with gypsum in ranges of 10, 25, and 50 percent by weight of the plaster, and subjected to a flame test to determine the effectiveness of the shale as a fire retardant. The test comprised the application of three-eighths of an inch of gypsum plaster, containing 10 percent of the shale on a ⅜ inch plaster board. The same procedure was followed in preparing ⅛ inch of plaster containing 25 percent of the shale on a ⅜ inch plaster board, and 1/16 inch of plaster containing 50 percent of the shale on wood and pressed board. The test was conducted by using a propane torch having a flame temperature in excess of 1900° C. on a 10 x 10 test area which was placed in front of the torch with the flame impinging the plastered surface. The temperature on the unexposed or reverse side of the plastered panels was determined by the time required for the heat to penetrate the plaster and char the substrate.

With the flame impinging the plaster surface, the substrate, i.e. backing of the plasterboard was charred after 15 minutes, whereas the panel containing none of the phosphate shale, or the blank, was charred within approximately one minute. Thus, the test indicates the effectiveness of the $P_2O_5$ and associated elements in the naturally-occurring shale to inhibit the flame.

Additional tests were conducted by using gypsum plaster and applying it in thicknesses from ⅜ inch to 1½ inches onto an asbestos substrate. Temperatures were recorded on the reverse side of the substrate at a distance of about ½ inch away while the plastered surface was subjected to a propane flame. The gypsum plaster contained 10 percent by weight of the phosphate shale having a $P_2O_5$ content of approximately 9.7 percent by weight. Plastered panels with and without the phosphate shale were flame tested with the following results.

TABLE III

| Plaster Thickness | Gypsum Plaster Temperature after ½ hr. (° F.) | Gypsum Plaster, 10% Phosphate Shale Temperature after 6 hrs. (° F.) |
|---|---|---|
| ⅜ inch | 400 | 176 |
| ¾ inch | 400 | 139 |
| 1 inch | 400 | 107 |
| 1½ inch | 400 | 80 |

It should be noted from the above tests that the gypsum plaster in thicknesses of ⅜ to 1½ inches gave temperature readings of 400° F. approximately one-half hour after the surface had been heated by the flame, whereas those samples which contained ten percent by weight of the phosphate shale did not exceed 176° F. The surface of the shale-containing plaster, after the test, had a vitreous appearance but did not crack and crumble as did the samples which did not contain the phosphate shale. This indicates that even at extreme temperatures the $P_2O_5$ and associated elements in the phosphate shale effectively retard the transfer of heat and cause the plaster to harden and take on a stone-like appearance.

The fire-resistant cementitious mixtures or compositions, such as gypsum plasters containing perlite, lime, or any of the other ingredients, also may be used to prepare fire-resistant wallboard merely by depositing the plaster between paper liners and permitting it to set. These cementitious compositions may be modified further by the addition of other known additives, such as bentonite, and fibrous materials, e.g. asbestos or glasswool, which improve both the strength and fire-resistance of the composition. In addition to the vermiculite and perlite, various forms of exfoliated mica, such as kerite, maconite, etc., may be used, together with surfacing materials, such as chalk, whiting, china clay, lithopone, and various combinations thereof.

While the present invention has been described with respect to specific embodiments, it is understood that it is not intended to be limited thereto and that many variations and changes may be made without departing from the spirit of the invention. The only limitations intended are those recited hereinafter in the appended claim.

The invention claimed is:

1. A fire-resistant plaster composition consisting essentially of (1) portland cement, (2) about 10–50% by weight of a natural-occurring phosphate rock having 0.25 to 40% by weight of $P_2O_5$ and a particle size ranging from about 10–350 mesh, (3) 2–12% by weight of lime, (4) 0 to 50% by weight of an exfoliated material selected from the group consisting of vermiculite, perlite, and mixtures thereof, (5) 0 to 2.0% by weight of an adhesive-binder, (6) and 0 to 1.0% by weight of a surface-active agent.

References Cited

UNITED STATES PATENTS

| | | | |
|---|---|---|---|
| 1,937,292 | 11/1933 | Moore | 106—110 |
| 2,090,625 | 8/1937 | Edwards | 106—109 |
| 2,303,463 | 12/1942 | Horne | 106—109 |
| 878,912 | 2/1908 | Timofeefe | 106—109 |
| 2,272,576 | 2/1942 | Penn | 99—232 |
| 2,632,743 | 3/1953 | Eckert | 260—17.3 |

FOREIGN PATENTS 500,416  2/1939  Great Britain.

OTHER REFERENCES

The Condensed Chemical Dictionary, Sixth ed., Reinhold Pub. Corp., N.Y., 1962, QD 5 C5, 1961, C10 (pages 99 and 887 relied upon).

ALEXANDER H. BRODMERKEL, *Primary Examiner.*

MORRIS LIEBMAN, SAMUEL H. BLECH, *Examiners.*

J. B. EVANS, *Assistant Examiner.*